T. B. DeFOREST & T. S. GILBERT.

Hoop-Skirts.

No. 5,334.

Reissued March 25, 1873.

Witnesses

John H. Shumway

A. J. Tibbits

Inventors.

T. B. DeForest & T. S. Gilbert

By their Attorney,

John E. Earle

A.M. PHOTO-LITHOGRAPHIC CO. N.Y. (OSBORNE'S PROCESS.)

UNITED STATES PATENT OFFICE.

THOMAS B. DE FOREST AND THOMAS S. GILBERT, OF BIRMINGHAM, CONN., ASSIGNORS, BY MESNE ASSIGNMENTS, TO ALEXANDER K. YOUNG.

IMPROVEMENT IN HOOP-SKIRTS.

Specification forming part of Letters Patent No. 74,672, dated February 18, 1868; reissue No. 5,334, dated March 25, 1873.

*To all whom it may concern:*

Be it known that we, THOMAS B. DE FOREST and THOMAS S. GILBERT, of Birmingham, in the county of New Haven and State of Connecticut, have invented a new Improvement in the Manufacture of Hoop-Skirts; and we do hereby declare the following, when taken in connection with the accompanying drawing and the letters of reference marked thereon, to be a full, clear, and exact description of the same, and which said drawing constitutes part of this specification, and represents, in—

Figure 1:
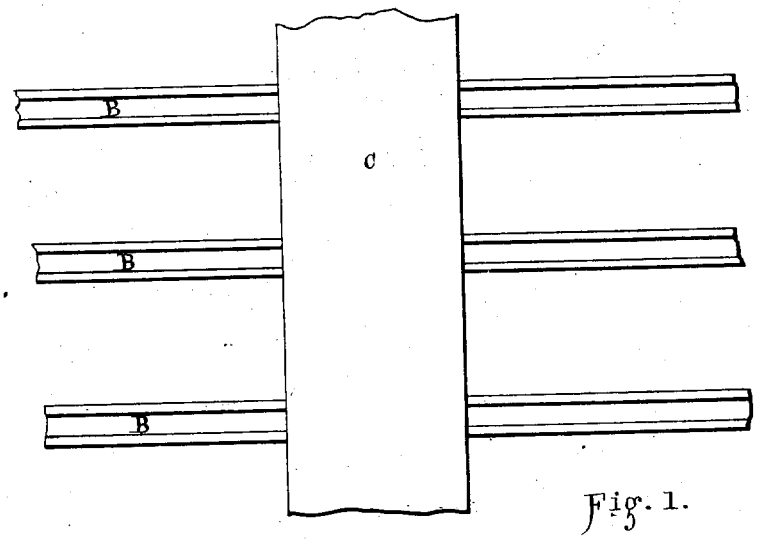
Figure 2:
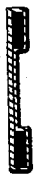

Figure 1, a front view of one of the vertical tapes with three springs attached; Fig. 2, a section of one of the springs enlarged; and in Fig. 3, a like section of a different construction.

This invention relates to an improvement in the manufacture of skirts composed of a series of springs attached to vertical tapes, and well known as hoop-skirts, the object being to produce a lighter and cheaper skirt than has heretofore been done; and the invention consists in inclosing one or more flat elastic wires within a covering, the said covering being, when sized, folded, and pressed, of greater width than the spring, so that, while it confines the spring to its proper position within the covering, it gives to the spring the appearance of being made from a much broader wire than it in reality is, and admits of securing the springs to the vertical tape by means of a metallic fastening passing through both the vertical tape and the material covering the spring. The peculiarity of this spring so combined is that the fabric is firm and elastic independently of the steel wires which are enveloped by the cloth, the wires being used only to support the cemented strip, and to give it more elasticity than it otherwise would possess; and the effect is that a broad spring can be produced having sufficient elasticity for all practical purposes without the weight and cost of an entire metal spring, and yet not compressible by any force to which it is likely to be subjected in ordinary use. The cement used must be of such a kind that it becomes stiff and firm when dry, and we find glutinous substances the best—such as a mixture of flour and glue; but any cement which becomes rigid and makes the fabric practically elastic is good, said cement, or its equivalent, constituting, as it were, an artificial spring, which, in connection with the metallic wire employed, renders the whole fabric, without regard to its width, homogeneous in character, or, in other words, elastic without being compressible.

In order to the clear understanding of our invention, we will proceed to describe the same as illustrated in the accompanying drawing.

In Fig. 2, we represent the spring as two flat wires inclosed within the same covering, the wires being denoted in black. Various devices may be employed in covering the two wires. One, and, we think, practically the best, is to take a narrow strip of fabric, sufficient in width to surround the two wires and form the space between the two; then the two wires with the fabric are drawn through an apparatus prepared for the purpose, the fabric being sized with any adhesive material, and the wires sustained equidistant from each other, the apparatus folding the fabric over the wires and pressing it down into the space between, the sizing being sufficient, or other sizing being added, so that, when thoroughly dried, the wires will be sustained at their given distances from each other—one wire at each edge of the folded fabric. The wires may be very light and the fabric equally light; and, when completed, the article produced has the appearance of a broad spring.

Figure 3:
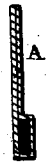

Instead of the two springs, as seen in Fig. 2, a single spring may be inserted, as in Fig. 3, and the fabric guided and folded so as to leave an edge, A, of fabric upon the spring, as denoted in said Fig. 3. This folded edge, being sized and pressed, secures the wire in its position in like manner as first described, and gives the like appearance of a broad spring, the sizing in all cases being sufficient to sustain that portion of the fabric at the edge of the wire, or between the wires; or, if preferred, and to give more material at the edge, a single spring may be inserted at one edge and a cord at the other edge.

In order to prevent the oxidation of the iron wire from discoloring the covering it is desirable to cover the wire with a double covering, of which paper forms the foundation next to the wire, and some textile fabric forms the surface, the whole being cemented so as to be rigid and to maintain the width of the fabric against the collapsing pressures to which it is subjected in ordinary use.

To construct a skirt from springs thus formed, pass the springs B through the pocket in the vertical tape C in the usual manner; then insert an eyelet or other suitable metallic fastening through the vertical tape, and through the fabric of the covering of the spring, as denoted in Fig. 1; and this may be done on the former; and the same means which secure the springs in the vertical tape may also lock the two ends of the spring within the pocket of the tape.

A skirt constructed in this manner has every appearance of a strong spring, but is much lighter than the ordinary skirts, as the wire employed for the spring may be much lighter than that used in the ordinary manner, and the manner of attaching the parts together is of the strongest possible character. Other wires may be added to increase the width, but forming a space in like manner between each two.

We do not wish to be understood as broadly claiming the introduction of two or more springs into a fabric, as such is not new; but in cases when it has been done the fabric has been first formed into pockets for the reception of the springs, and the springs themselves covered separately and independent of the said pockets; but in all cases the woven fabric is not designed to be, and is not made, rigid by any cement, so as to maintain the wires in their proper positions, as is the case in my invention. This arrangement is seen in several well-known patents for the whole or lower portions of a skirt. It will be observed that we do not in any way form a pocket in the fabric, the covering being simply a folded fabric, the folds being secured by strong sizing and pressed hard together. Nor do we claim a combination of two or more wires covered with cloth or other textile fabric when the covering is not cemented with cement which hardens and makes the interspace between the wires rigid, so as to maintain the whole fabric against collapsing by the pressures to which it is subjected in ordinary use, as such a combination, forming a compressible double wire, is well known.

What we do claim as our invention, and desire to secure by Letters Patent, is—

1. A skirt-hoop composed of two or more wires kept permanently apart at a regular distance from each other by means of a covering, in which they are inclosed, and a cement substantially of the character described, which, when set, renders the whole fabric more unyielding, as set forth, the object being to produce a broad and firm elastic skirt-hoop lighter and cheaper than if made entirely of metal, and yet practically possessing all the valuable qualities of metal.

2. A skirt-hoop composed of only one wire, inclosed within a covering wider than the wire by means of a cement substantially of the character described, which, when set, renders the whole fabric more unyielding, substantially as described.

3. A skirt-hoop composed of one or more wires, inclosed within a covering of paper and cotton or some other textile fabric, combined and cemented on the wires by a cement, which, when set, renders the whole fabric more unyielding, substantially as described.

THOS. B. DE FOREST.
THOMAS S. GILBERT.

Witnesses for T. B. DE FOREST:
CATHARINE ST. JOHN ARNOLD,
WM. B. BENNETT,
Witnesses for THOS. S. GILBERT:
CHARLES C. BLAIR,
WM. B. BENNETT.